US008504915B2

(12) United States Patent
Simmons et al.

(10) Patent No.: US 8,504,915 B2
(45) Date of Patent: Aug. 6, 2013

(54) OPTIMIZATIONS FOR HYBRID WORD PROCESSING AND GRAPHICAL CONTENT AUTHORING

(75) Inventors: Alex Jacob Simmons, Seattle, WA (US); Sripriya P. Vasudevan, Issaquah, WA (US); David John Rasmussen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 12/758,153

(22) Filed: Apr. 12, 2010

(65) Prior Publication Data
US 2011/0252309 A1    Oct. 13, 2011

(51) Int. Cl.
*G06F 17/00*        (2006.01)
(52) U.S. Cl.
USPC ............ 715/256; 715/780; 715/767; 715/788
(58) Field of Classification Search
USPC .................. 715/780, 767, 788, 255, 256, 252
See application file for complete search history.

(56) References Cited

U.S. PATENT DOCUMENTS

| 5,847,706 | A | * | 12/1998 | Kingsley | 715/788 |
| 7,191,405 | B1 | | 3/2007 | Jaramillo | 715/763 |
| 7,296,240 | B1 | | 11/2007 | Yalovsky et al. | 715/770 |
| 7,949,954 | B1 | * | 5/2011 | Jezek, Jr. | 715/800 |
| 2002/0032705 | A1 | * | 3/2002 | Higashiyama et al. | 707/530 |
| 2003/0067497 | A1 | * | 4/2003 | Pichon | 345/853 |
| 2005/0289453 | A1 | | 12/2005 | Segal et al. | 715/512 |
| 2006/0253777 | A1 | | 11/2006 | Yalovsky et al. | 715/530 |
| 2007/0079236 | A1 | * | 4/2007 | Schrier et al. | 715/517 |
| 2007/0250770 | A1 | * | 10/2007 | Gu et al. | 715/542 |
| 2008/0052637 | A1 | * | 2/2008 | Ben-Yoseph et al. | 715/800 |
| 2008/0244422 | A1 | * | 10/2008 | Hilgers et al. | 715/763 |
| 2012/0017162 | A1 | * | 1/2012 | Khokhlov | 715/765 |

OTHER PUBLICATIONS

Work with Note Containers—OneNote—Microsoft Office Online, http://office.microsoft.com/en-us/onenote/HA102140641033.aspx, printed Feb. 11, 2010 (see link).
Daniel Escapa's OneNote Blog, http://blogs.msdn.com/descapa/, printed Feb. 11, 2010 (see link).
Take and format notes—OneNote—Microsoft Office Online, http://office.microsoft.com/en-us/onenote/HA101212551033.aspx, printed Feb. 11, 2010 (see link).
Microsoft Office OneNote 2003 Product Guide, http://download.microsoft.com/download/7/5/8/7583ebf5-29e8-4a7d-be56-6cc00dfba970/onenoteproductguide.doc, printed Feb. 11, 2010 (see link).

* cited by examiner

*Primary Examiner* — Adam M Queler
(74) *Attorney, Agent, or Firm* — Merchant & Gould (57) ABSTRACT

Embodiments provide interactive computer-implemented rich heterogeneous content authoring features. In an embodiment, a computer-implemented method includes an interaction model that uses an input state associated with a user operation and an electronic page interface to provide an interactive authoring experience. In one embodiment, a note taking client can include an interaction model used in part to automatically control aspects of an electronic note page. Other embodiments are included and available.

20 Claims, 11 Drawing Sheets

FIGURE 7

OPTIMIZATIONS FOR HYBRID WORD PROCESSING AND GRAPHICAL CONTENT AUTHORING

BACKGROUND

Ultimately, a user's experience with a computer application dictates whether the user recommends the product to others or purchases additional products from an application vendor. For example, note taking application users expect input flexibility, allowing for the positioning of content anywhere on an electronic page, including text, electronic ink, and pictures (e.g., slides, spreadsheets, images, etc.). That is, note taking application developers attempt to provide free-form interactive operations for application users. For example, a developer may choose to write code that directs a user's click to the nearest content based on some proximity factor or directly onto a page where the user clicked.

In some cases, inefficiencies compound with wasted input operations that may include any additional corrective actions required to obtain a desirable result. For example, a note taking application may be biased towards creating new objects on a page rather than adding to existing content as a user expected to result from an input operation. Moreover, due in part to free form interactions and display limitations, computer-implemented notes may tend to appear in disarray or cluttered. For example, electronic notes may not align from page to page, resulting in a disorganized or messy appearance as the user flips between multiple pages. One valuable aspect of a quality electronic note taking application is a flexible page surface. However, too much flexibility can lead to messy notes. A note taking application that includes a balance of flexibility and imposed structure can enable users to create good looking, uncluttered notes, and at the same time, make it easy to work with an electronic page interface.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide interactive computer-implemented rich heterogeneous content authoring features. In an embodiment, a computer-implemented method includes an interaction model that uses an input state associated with a user operation and an electronic page interface to provide an interactive authoring experience. In one embodiment, a note taking client can include an interaction model used in part to automatically control aspects of an electronic note page. Other embodiments are included and available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
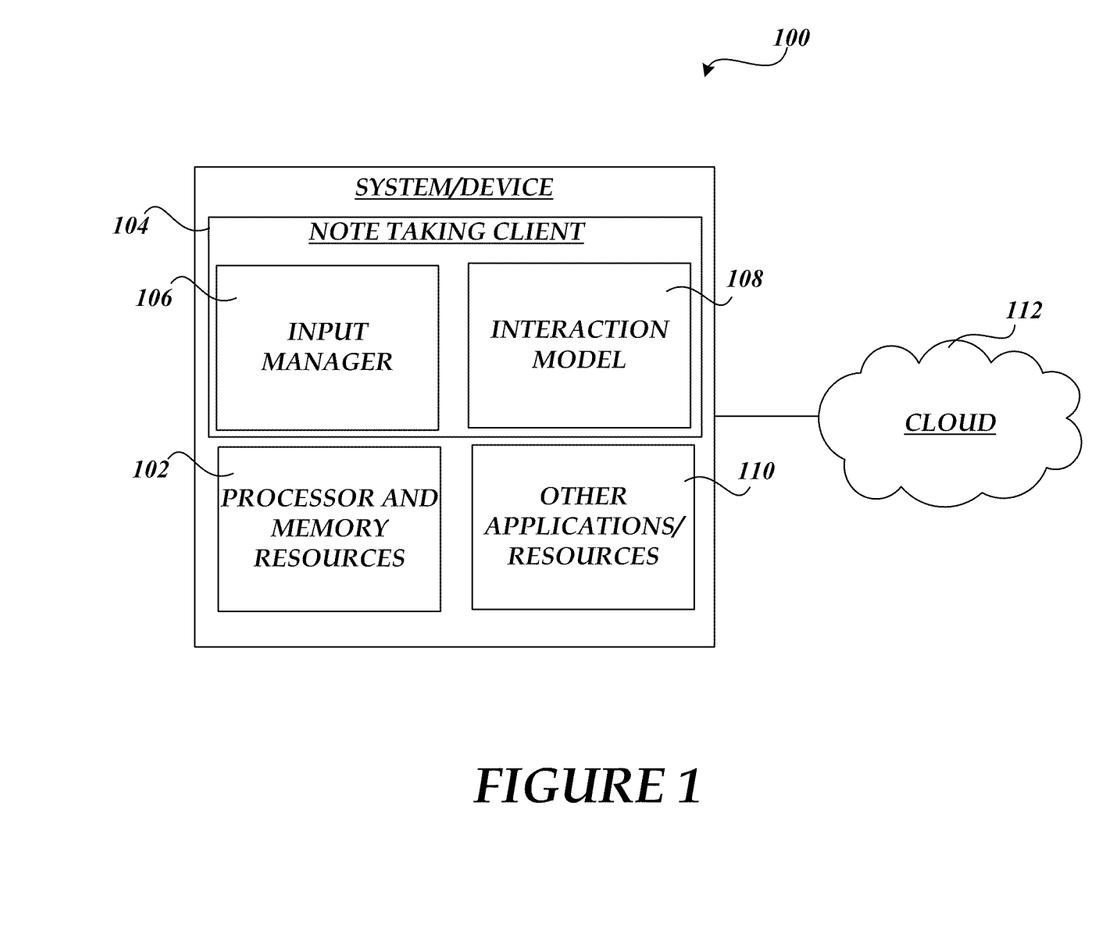
FIG. 1 is a block diagram of an exemplary computing system.

FIG. 1 is a block diagram of an exemplary computing system 100. As discussed below, components of the system 100 enable free form interaction using features of a note taking application that including electronic text features, electronic ink features, electronic pictures, and/or other note taking features. The components of the system 100 operate to provide a rich note taking experience using a free-form interaction model including presentation features to present page content based in part on user input operations. In one embodiment, the components can be configured according to an interaction model that provides balanced degrees of flexibility and imposed structure.

In an embodiment, the system 100 includes electronic note taking features that operate to position an originating container and a cursor at a default position of an electronic page as part of a first input operation associated with a note taking application. For example, components of the system 100 can operate to create and position an originating container at an upper left hand position of a new or blank electronic page as part of responding to a first click or tap or other first input. It will be appreciated that each user device/system can include different input options, such as a mouse, keyboard, stylus, finger, etc.

Upon receiving a second input operation, components can operate to remove the originating container and position a new container at an insertion point associated with the second input operation. The system 100 of an embodiment uses a first input operation on a picture or associated container as part of selecting the picture, and a second input operation on the picture as part of positioning a cursor at the insertion point in the picture associated with the second input operation. In one embodiment, the system 100 operates to automatically resize a note container based in part on a size of a page and an associated window or other interface, as discussed further below.

As shown in FIG. 1, the computing system 100 of an embodiment includes a number of components including processor and memory resources 102. The system 100 also includes a note taking client or application 104 that includes an input manager component or input manager 106, and/or an interaction model 108, but is not so limited. In one embodiment, the input manager 106 can be used to track user input operations and maintain input states associated with the note taking application 104, but is not so limited. As discussed below, the interaction model 108 can be configured to automatically provide interactive note taking features based in part on inputs tracked by the input manager 106 or some other component. In one embodiment, the interaction model 108 can be configured to control location of a cursor and/or insertion point on an electronic note taking page.

As shown, the exemplary system 100 of FIG. 1 includes other applications and resources 110, such as an operating system, network access components, graphics and display drivers/components, communication components (e.g., radio, GSP, VOIP, etc.), input devices (e.g., microphone, camera, haptic, tablet, touch screen, etc.), and other features. In one embodiment, the computing system 100 can be networked with a serving infrastructure to provide web-based note taking and other application services. For example, a browser component of the system 100 can be used in conjunction with a serving infrastructure to provide a web-based note taking application experience that includes communication using cloud 112. Data, metadata, and other aspects of the note taking application can be stored locally and/or remotely.

As one example, the client 104 can be used in conjunction with electronic features of a processor-based device or system that includes using handwriting, text, and other processing functionalities to provide free-form note editing features. For example, electronic tablet features can include electronic ink manipulation techniques that enable users to create and modify electronic notes. The input manager 106 can operate to identify handwriting strokes as being part of a word or drawing, and may identify objects based on an input, metadata, and/or file type. The electronic features can integrate ink, text, voice, and/or other processing operations. The availability of multiple input interfaces provides a user with a variety of ways to create electronic notes, including free from interactive inputs that result in a rich electronic note taking experience. While a certain number and types of components are described above, it will be appreciated that other numbers and types can be included according to various embodiments. Accordingly, component functionality can be further divided and/or combined with other component functionalities according to desired implementations.

Figure 2:
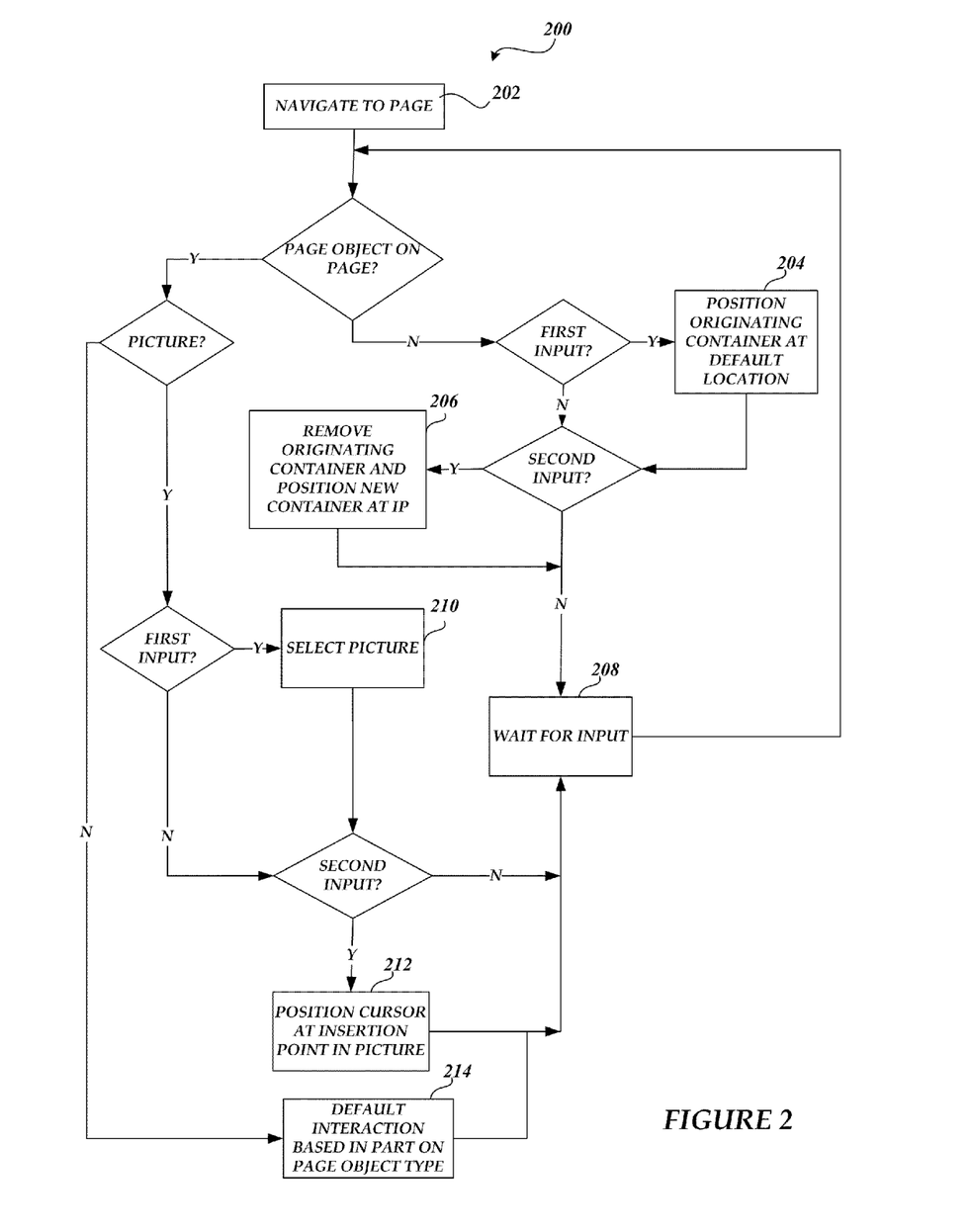
FIG. 2 is a flow diagram illustrating aspects of an exemplary electronic note taking process.

FIG. 2 is a flow diagram illustrating aspects of an exemplary electronic note taking process 200. For example, a note taking or other word processing and graphical content authoring application can include aspects of the exemplary process 200 as part of providing a rich and intuitive note taking experience. At 202, an electronic note page is selected and displayed within a display window having a size and configuration. For example, a user can use a note taking application to create new pages and modify existing pages that include page objects and other information, such as note containers that include electronic text and/or ink, pictures, audio, video, file attachments, and/or other noteworthy content for graphical display. In one embodiments, content can be included as part of a container and/or directly on an associated page.

As part of an interaction model of an embodiment, the process 200 can use the presence of a page object, such as a note container for example, on an electronic page as part of automating the user's note taking experience. Containers of an embodiment can be used to contain text, ink, images, and other digital content. For example, the note taking application can be used to create a blank note page that a user can use to as part of electronic note taking operation including creating and/or positioning one or more containers on the page. In accordance with an embodiment, a note container comprises a page object and can include digital text and/or digital ink, but is not so limited.

The process 200 of an embodiment operates in part by tracking page status parameters including page object (e.g., text container(s), picture container(s), etc.) and/or input states associated with each page for use in conjunction with the interaction model. For example, the process 200 can track the number of user clicks, click locations, and/or container numbers and types and store the associated parameters in memory. In one embodiment, a tracking bit is used to track a first input state (e.g., a logical "1" equates to a first input operation on a blank page). The bit of a tracking register may or may not be reset based in part on the interaction model implementation, described below.

If the current page does not include a page object (e.g., a note container) and an input state associated with a user operation is a first input state (e.g., first click/tap on the page), then the flow proceeds to 204 and the process 200 creates and positions an originating container and a cursor at a default location on the current page. The user can interact with originating container using typing inputs, inking inputs, vocal inputs, etc. In one embodiment, the process 200 can include an interaction model that operates to position a note container in an upper left hand portion of the current page, aligned with any originating placeholders, configured for a left to right viewing audience. In another embodiment, the interaction model can be configured to position a note container in an upper right hand portion of a current page, aligned with any originating placeholders, configured for a right to left viewing audience.

At 206, the process 200 operates to remove the originating container and position a new container at an insertion point associated with a second user operation corresponding with a second input state (e.g., second click/tap on the page outside of the originating container as compared to a double click). The user can interact with new container using typing inputs, inking inputs, vocal inputs, etc. If a second user operation has not occurred, the flow proceeds to 208 and the process 200 waits for a user operation.

If there is a page object comprising a picture or picture container on the page and the input state associated with the user operation is a first input state for the picture, the flow proceeds to 210 and the picture is selected. At 212, the process 200 operates to position a cursor at an insertion point within the bounds of the picture associated with a second user operation corresponding with a second input state for the picture (e.g., second click/tap on the selected picture). If a second user operation has not occurred, the flow proceeds to 208 and the process 200 waits for a user operation. At 214, if the page object is not a picture, then default interaction applies based in part on the type of page object. For example, a first default action for a drawing or file attachment operates to select the associated page object. While a certain number and order of operations is described for the exemplary flow of FIG. 2, it will be appreciated that other numbers and orders can be used according to desired implementations.

Figure 3A:
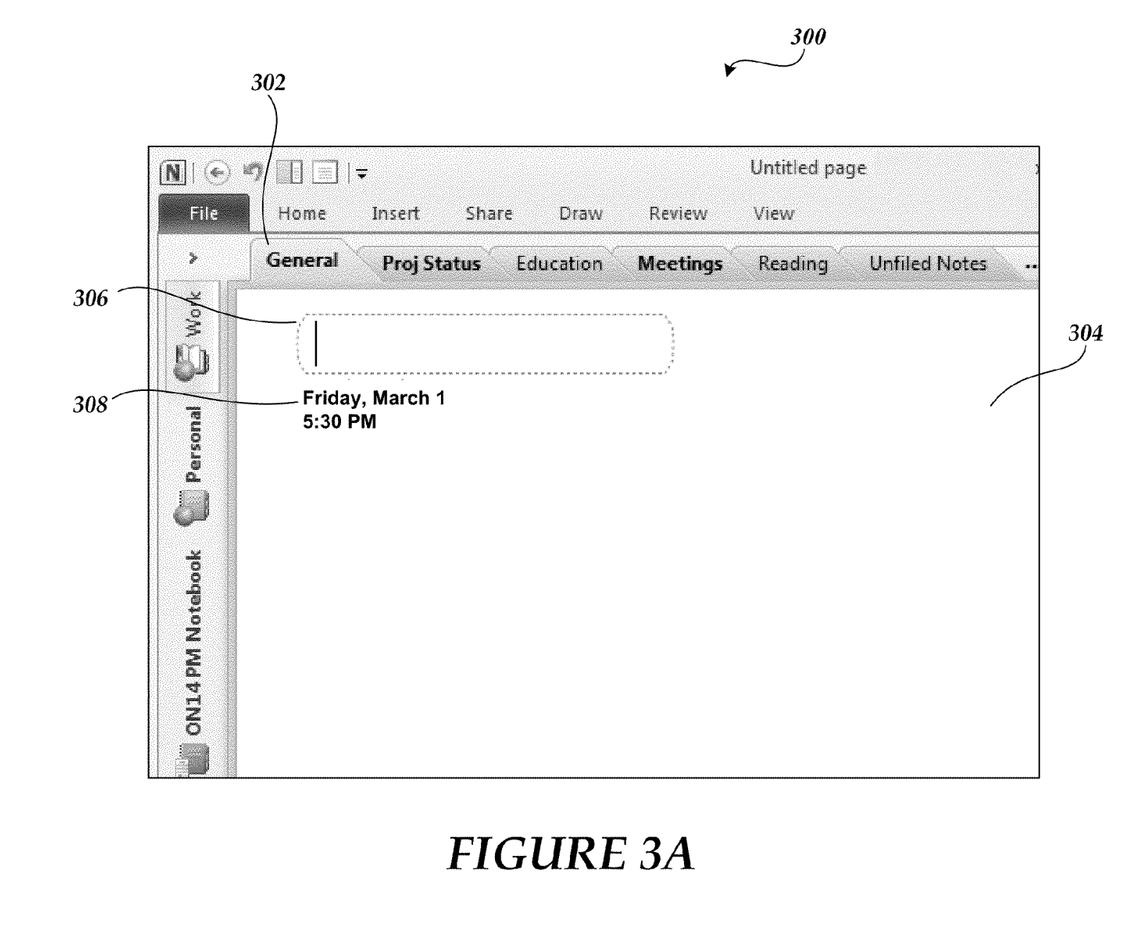
FIGS. 3A-3E depict aspects of an exemplary electronic note taking application interface.
Figure 3B:
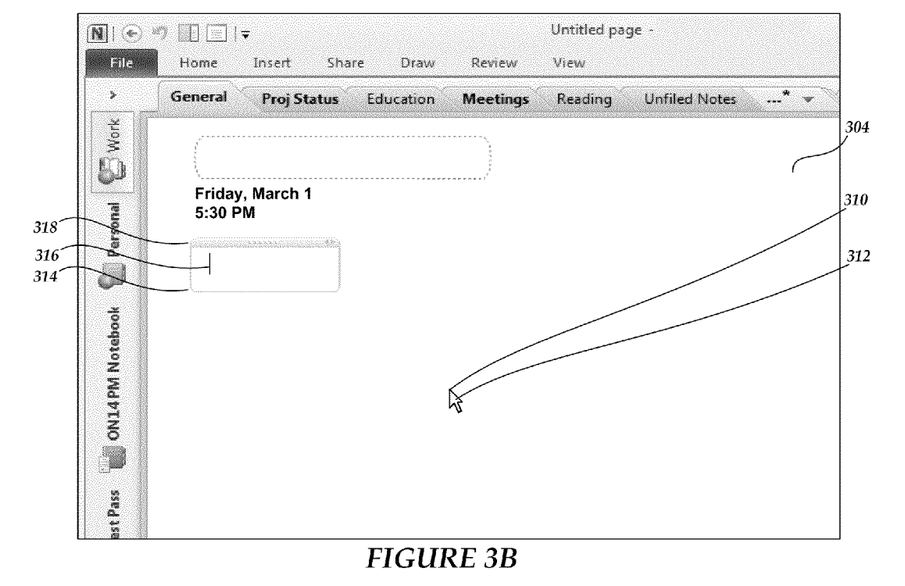
Figure 3C:
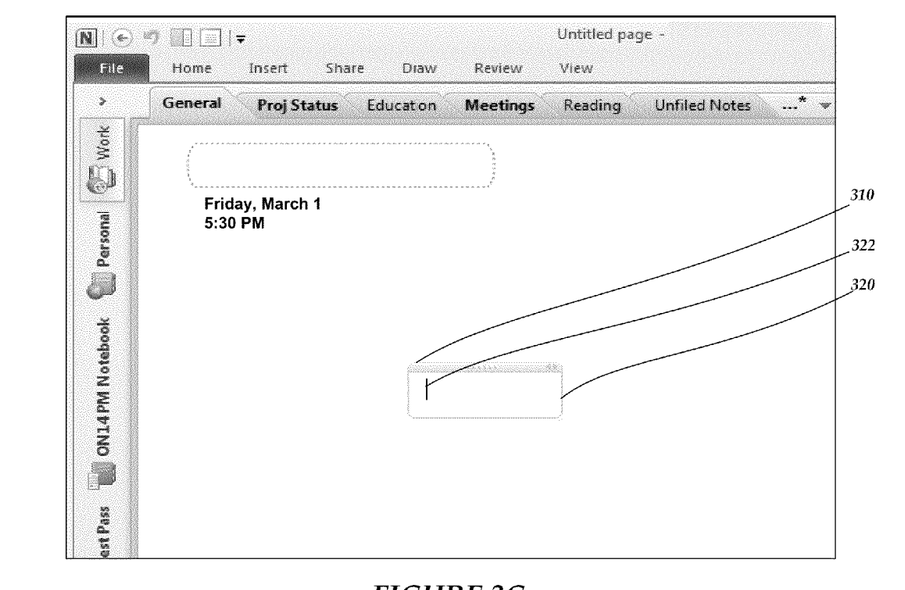

FIGS. 3A-3E depict aspects of an exemplary electronic note taking application interface 300. Referring to FIGS. 3A-3C, the interface 300 is shown at various times as a user uses the note taking application. As shown in FIG. 3A, the user has opened or selected an electronic page 302 that includes a page display surface 304. As shown, the page display surface 304 of one embodiment includes predefined placeholders 306 and 308 for presenting a page title and date/time information.

As shown in FIG. 3A, the page display surface 304 does not include a page object, such as a note container for example. Assume for this example that the user has not yet interacted with the page display surface 304. Thus, an input state associated with the electronic page 302 at this instance is zero, signifying that a first input operation has not occurred. As described above, the input state can also be reset to zero when a user re-navigates to a page that does not include or is absent a note container. The input state can also be reset when switching window focus or restarting the note taking application.

Referring to FIG. 3B, the user's first input operation (e.g., click/tap) coincides with a page location 310 (operation shown by cursor 312) on the page display surface 304. Since this is the first input operation (e.g., first click/tap) associated with the page, the note taking application of an embodiment automatically and simultaneously creates an originating note container 314 and cursor 316 at a default location 318 on the page display surface 304, saving the input state to memory. In one embodiment, the default location 318 coincides with an upper left hand page position in alignment or justified with any placeholder objects. Accordingly, an input state associated with the electronic page 302 at this instance is one, signifying that a first input operation has occurred.

Referring to FIG. 3C, the user's second input operation (e.g., click/tap) occurs again at page location 310 of page display surface 304. Thus, an input state associated with the electronic page 302 at this instance is two, signifying that a second input operation has occurred. The second input operation (not classified as a double click) causes the note taking application of an embodiment to automatically remove originating note container 314 and create a new note container 320 and cursor 322 at page location 310 on the page display surface 304.

Figure 3D:
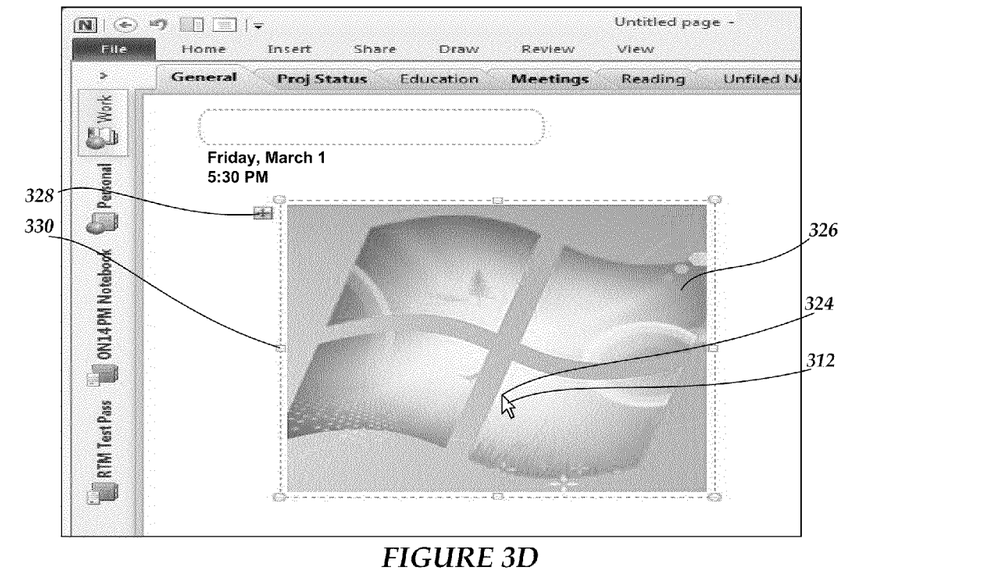

Referring to FIG. 3D, the user's first input operation (e.g., click, tap, arrow over, etc.) coincides with a page location 324 (operation shown by cursor 312) coinciding with picture or image 326 displayed on the page display surface 304. Assume for this example that the input is a first input operation on the image 326. Since this is the first input operation (e.g., first click/tap) associated with the image, the note taking application of an embodiment automatically selects the image 326, depicting the user selection using informative indicia (e.g., target icon 328 and highlighted outline 330), saving the input state to memory. Accordingly, an input state associated image 326 at this instance is one, signifying that a first input operation has occurred for this page object.

Figure 3E:
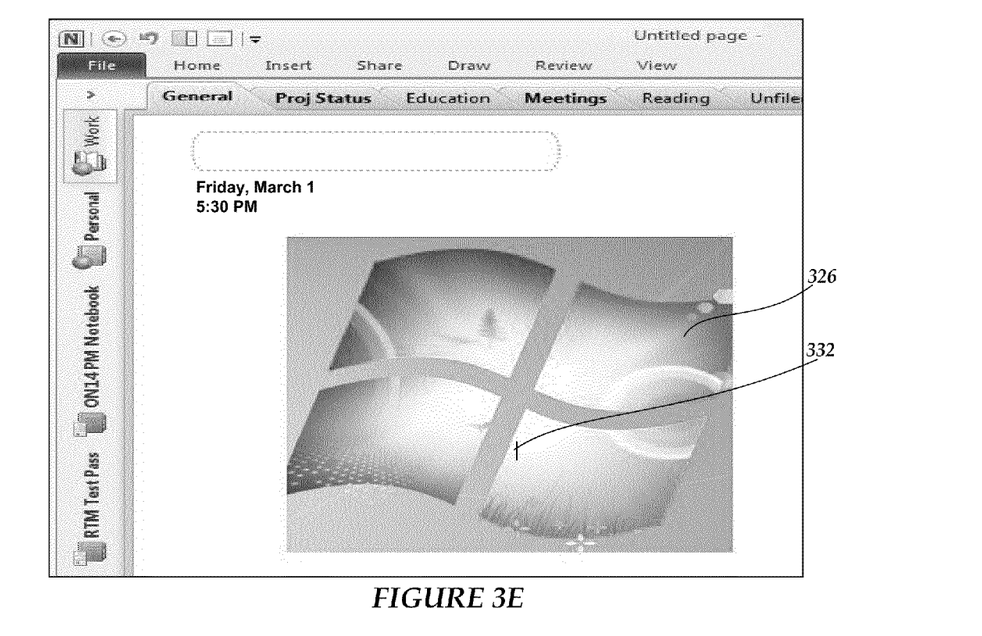

Referring to FIG. 3E, the user's second input operation (e.g., click, tap, etc.) occurs again at page location 324, coinciding with image 326 displayed on the page display surface 304, the user input continuing to be relative to a selection state of the image or picture. Thus, an input state associated with the image 326 at this instance is two, signifying that a second input operation has occurred. The second input operation causes the note taking application of an embodiment to automatically insert a cursor 332 at page location 324 within image 326.

The image can also be selected by arrowing to the image using arrow keys which can also correspond with a first image input state. Subsequent interaction with the image (e.g., a click, tap, etc.) on the image operates to insert a cursor at the insertion point. As long as the second input operation coincides with image 326 (and not necessarily at a same location of a first click/tap operation), the note taking application of this embodiment automatically inserts a cursor at an associated insertion point. At all or select times, the note taking application operates to track and store input states, container states, and/or other page parameters in memory.

Figure 4:
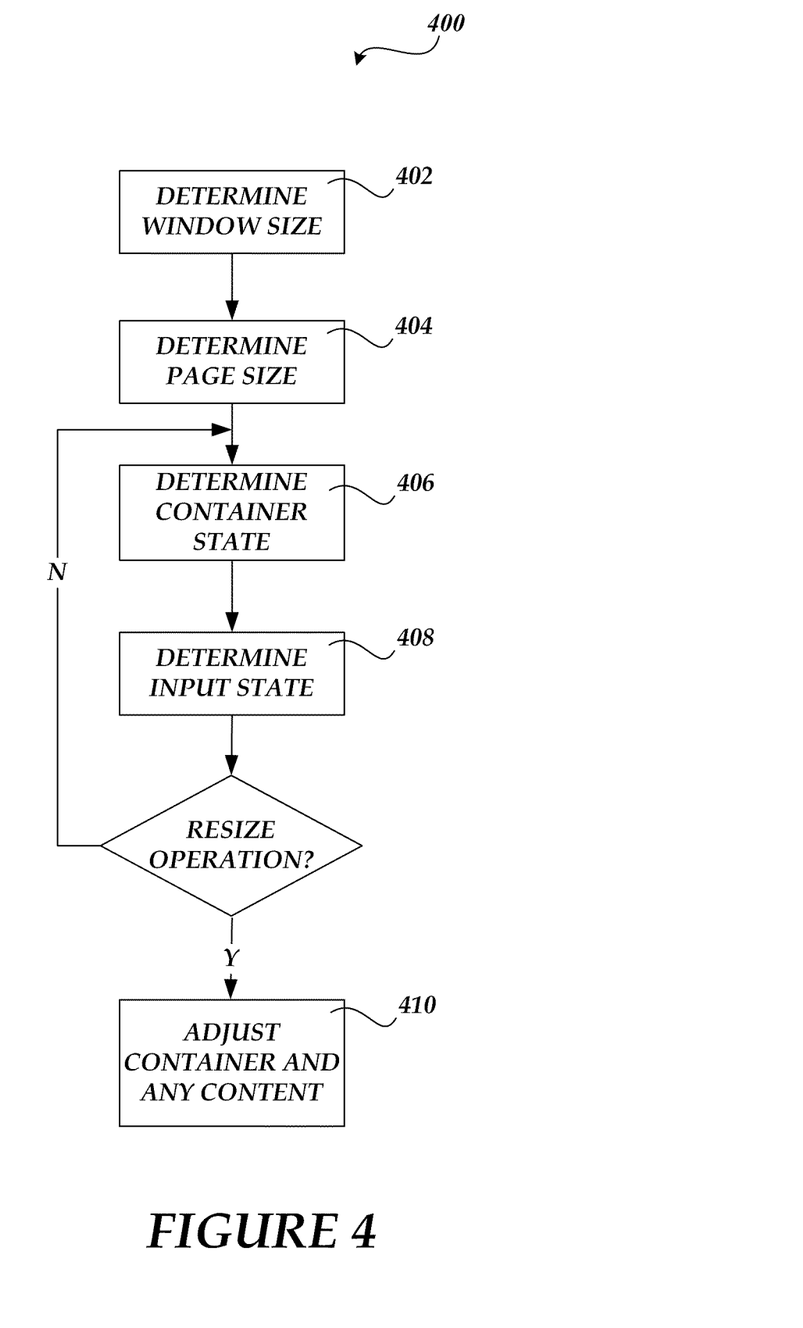
FIG. 4 is a flow diagram illustrating aspects of an exemplary electronic note taking process.

FIG. 4 is a flow diagram illustrating aspects of an exemplary electronic note taking process 400. For example, a note taking application can include aspects of the exemplary process 400 as part of providing a rich interactive computer-implemented note taking experience. At 402, the process 400 operates to determine a size of an active window used to display aspects of an electronic note taking application interface, such as one or more sections, pages, interaction tools, and other note taking application features. For example, a note taking application or other component can operate to track window dimensions (e.g., length×width) for open application windows of a user computer display.

At 404, the process 400 operates to determine a size of an electronic page displayed in the active window. For example, a note taking application or other component can operate to track electronic note page dimensions (e.g., length×width) displayed in an open window. At 406, the process 400 operates to determine a container state of a selected electronic note page. For example, a note taking application or other component can operate to track rendering of containers (e.g., text containers, ink containers, picture containers, etc.) on an electronic note page. In an embodiment, a container state value can be used to track container renderings for each electronic page (e.g., 0=zero containers, 1=one container, 2=two containers, etc.). In one embodiment, a container state can be used to track types of container renderings for each electronic page (e.g., 0nc=zero note containers, 1nc=one note container, 2nc=two note containers, 0pc=zero picture containers, 1pc=one picture container, etc.)

At 408, the process 400 operates to determine an input state associated with the selected electronic note page. For example, a note taking application or other component can operate to track the number of times that a user has interacted with each page and/or page object. In an embodiment, an input state value can be used to track user inputs for each electronic page (e.g., 0=no clicks/taps, 1=first click/tap, 2=second click/tap, etc.). In one embodiment, the process 400 operates to reset an input state if a user navigates to another page before returning to a previous used page. At 410, the process 400 of an embodiment operates to adjust aspects of a note container and any associated content if a note taking application window is resized to at least one resize threshold and the current page includes only one note container. In one embodiment, first and second adjustment or transition ranges are used to determine whether to resize an electronic note page based in part on associated window size and page size parameters.

If the window has not been resized, the flow returns to 406. In an alternative embodiment, the process 400 operates to adjust aspects of multiple note containers displayed on a page using adjustment thresholds for each container based in part on a location and a type of content of each note container. For example, the process 400 can operate to prioritize adjusting of text containers over ink containers and picture containers, and prioritize adjusting ink containers and picture containers. Various window parameters, page parameters, container state parameters, input state parameters, and other parameters can be stored in local and/or remote memory. While a certain number and order of operations is described for the exemplary flow of FIG. 4, it will be appreciated that other numbers and orders can be used according to desired implementations.

Figure 5:
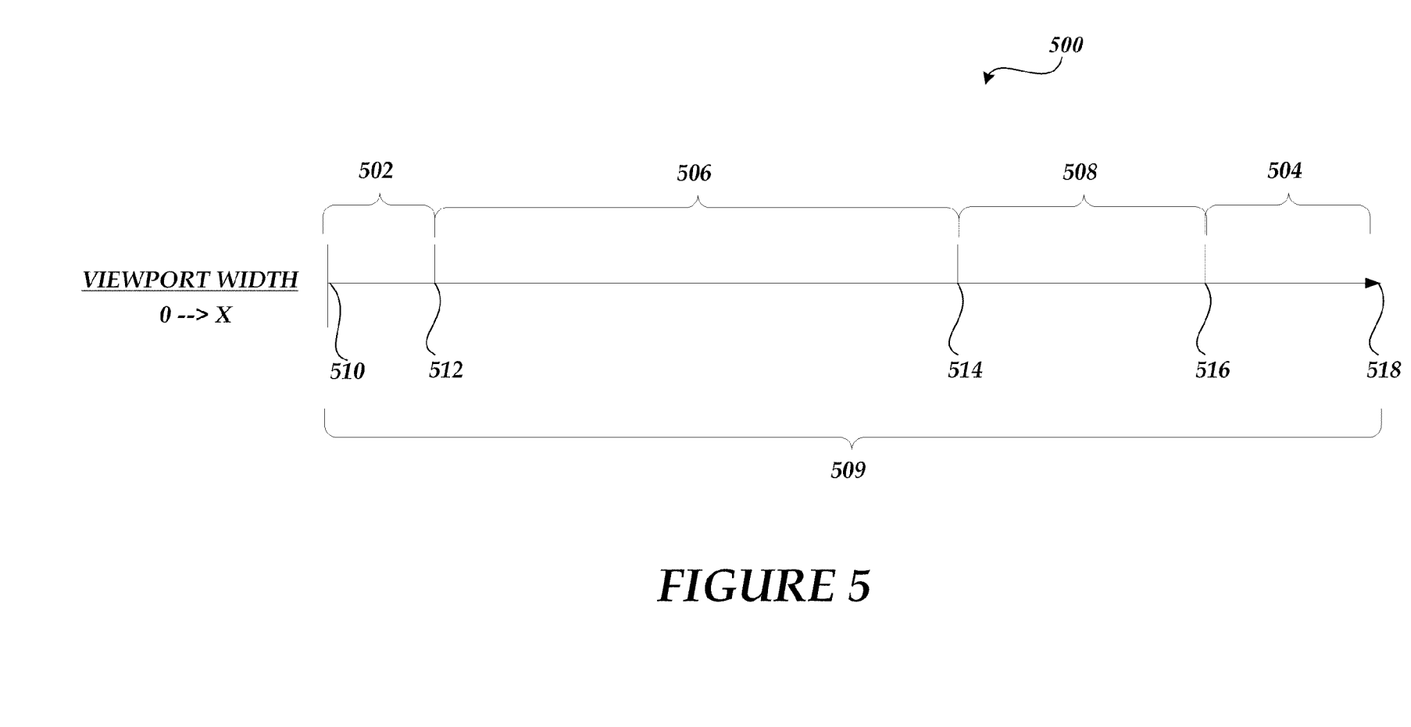
FIG. 5 is a diagram depicting aspects of an exemplary interaction model.

FIG. 5 is a diagram depicting aspects of an exemplary interaction model 500 that can be used to automatically adjust aspects of a note taking application interface. For example, the interaction model 500 of one embodiment can be used in conjunction with an operating system component or components to automatically adjust aspects of the note taking application interface within a display window. As shown in FIG. 5, the interaction model 500 of an embodiment includes first and second non-resizing zones or ranges 502 and 504, and first and second resizing zones or ranges 506 and 508, but is not so limited.

The non-resizing ranges 502 and 504 include distinct page ranges (e.g., width portions in inches, centimeters, etc.) wherein a single note container is not to be resized including freezing any associated content from reflow. For example, if a user resizes an application window that includes a single note container within these non-resizing ranges, the note taking application will not resize the note container or re-render any associated content to extend further down and/or across a page.

The resizing ranges 506 and 508 include distinct page ranges wherein the note taking application can automatically resize a single note container and reflow any associated content (e.g., digital text) based in part on certain transition thresholds and page and/or window sizes. Each resizing range of one embodiment can be used as a queue for a note taking application to use as part of automatically resizing a note container, including reflow of any associated content (e.g., extend content further down and/or across a page) as the user resizes an associated application window. For example, when resizing an application window, if an application window width coincides with a resize range portion, the note taking application can automatically resize the note container and re-render any associated content on the page.

As shown in FIG. 5, the interaction model 500 of one embodiment can be used in conjunction with a base viewport width 509 to define a non-resizing range 502 as including a leftmost portion 510 (e.g., zero inches, $1^{st}$ character beyond margin space, etc.) of the viewport up to and including a first transition threshold 512 (e.g., 1.5 inches), and a non-resizing range 504 as including anything greater than or equal to a third transition threshold 516 (e.g., 8.5 inches) up to a maximum viewport width 518.

In accordance with such an embodiment, resizing range 506 of the interaction model 500 can be defined as including the first transition threshold 512 up to and including a second transition threshold 514 (e.g., 5.7 inches), and resizing range 508 can be defined as including the second transition threshold 514 up to and including the third transition threshold 516. As described above, the interaction model 500 can be used to control if and how much a note container is to be resized or adjusted based in part on associated viewport dimensions.

In one embodiment, the interaction model 500 can be used in conjunction with a note taking application to automatically resize a single note container of a note page using a first resizing threshold/percentage (e.g., resize container to 70% of available page width) when an application window width dimension is within the second resizing range 508, and to a second resizing threshold/percentage (e.g., resize container to 95% of available page width) when an application window width dimension is within the first resizing range 506. Other embodiments can include other interaction parameters and features.

Figure 6A:
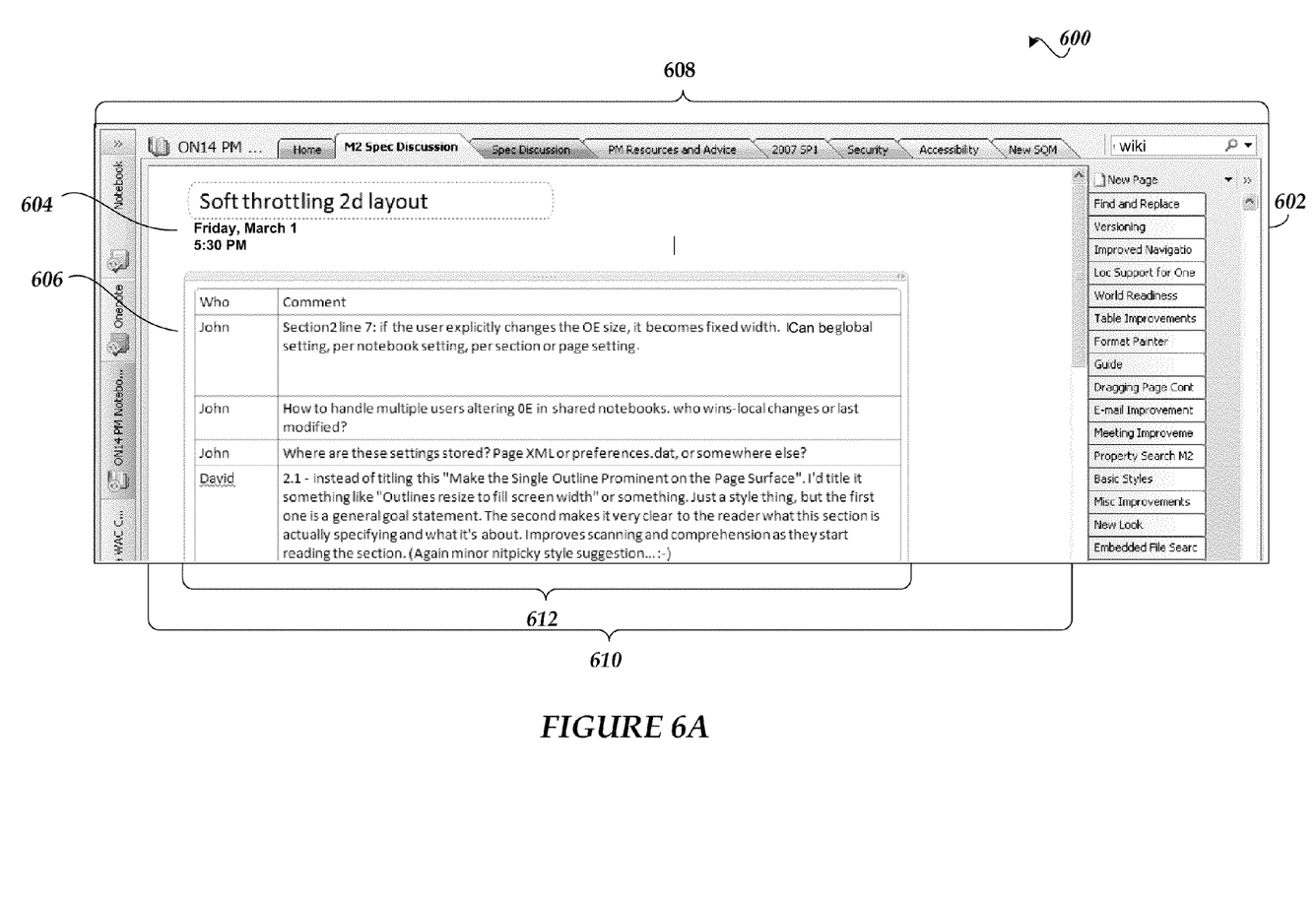
FIGS. 6A-6D depict aspects of an exemplary electronic note taking application interface.

FIGS. 6A-6D depict aspects of an exemplary electronic note taking application interface 600. As shown, FIGS. 6A-6D depict a progression of resizing operations to an application window 602 displaying aspects of a note taking page interface 604, including any associated adjustments made to the single note container 606 as part of a resizing operation. As shown in FIG. 6A, for the current application state, the application window 602 has a width dimension 608 and the page interface 604 has a width dimension 610. As the user resizes the application window 602, the width dimension 608 can change to larger and smaller dimensions, which may or may not affect the presentation of the note container 606 and/or any associated content according to an implemented interaction model.

Figure 6B:
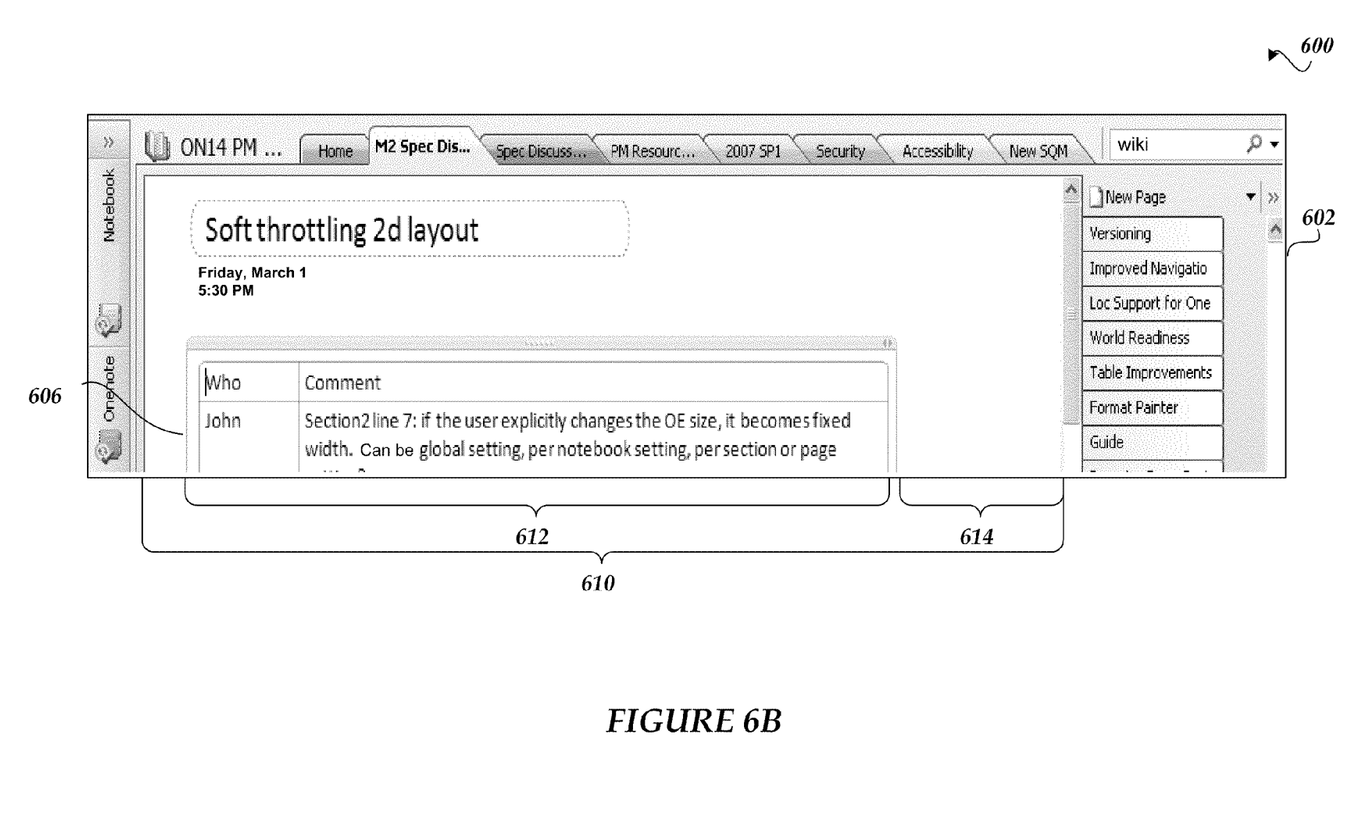

In one embodiment, an interaction model can be used with a note taking application to adjust a width dimension of the note container 606 based in part on a number of transition thresholds or states and at least one application window dimension. For this example, the exemplary interaction model 500 will be used to describe any adjustments made to the note container 606 and any associated content. As shown in FIG. 6B, the application window 602 has been resized beyond the third transition threshold 516 and the width dimension 608 of application window 602 falls within the resizing range 508. Thus, the note taking application uses the resizing parameters of the interaction model 500 to automatically resize the note container 606.

In one embodiment, the interaction model 500 can be used to auto adjust a width of the note container 606 to fill approximately seventy percent (70%) of the available page dimension 610 based in part on the application window and/or page size. The remaining page area (approximately thirty percent (30%)) can be displayed as available space for incorporation of one or more additional containers. For the example described with reference to FIGS. 6B-6D, assume that page interface 604 includes a width dimension 610 of about 10.6 inches wide and a height dimension of about 8 inches high (e.g., 1024×768 pixels). If page tabs consume about 1.5 inches of width and about 0.5 inches is allocated for a collapsed left navigation pane etc., the maximum page width dimension for this example includes about 8.5 inches.

Thus, as shown generally in FIG. 6A, if the application window 602 is maximized and an exemplary page width dimension is 8.5 inches or greater, then the interaction model 500 can be used to adjust the container width dimension such that the note container 606 width fills 70% of the page width dimension, including the left margin. The 30% remainder portion 614 can be used as a canvas to create another note container for example. As shown in FIG. 6B, during window resizing, as long as the page dimension 610 remains within the resizing range 508, the note container 606 is resized to fill 70% of the available page width, again including the left margin and the 30% remainder portion 614. That is, if the page contains only a single outline or note container for example, and the page width is within resizing range 508, then the outline fills 70% of the page width as the application window 502 is resized within this range.

Figure 6C:
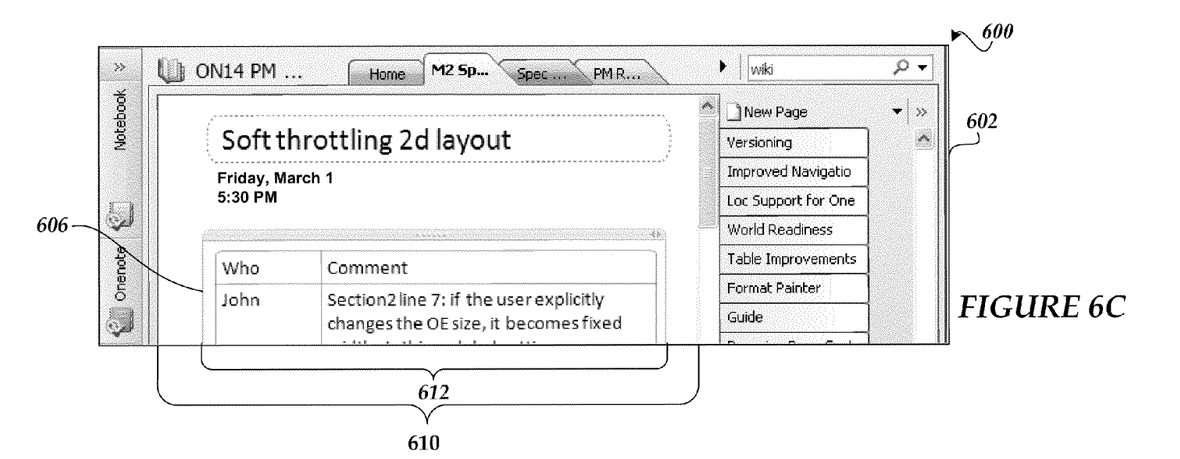
Figure 6D:
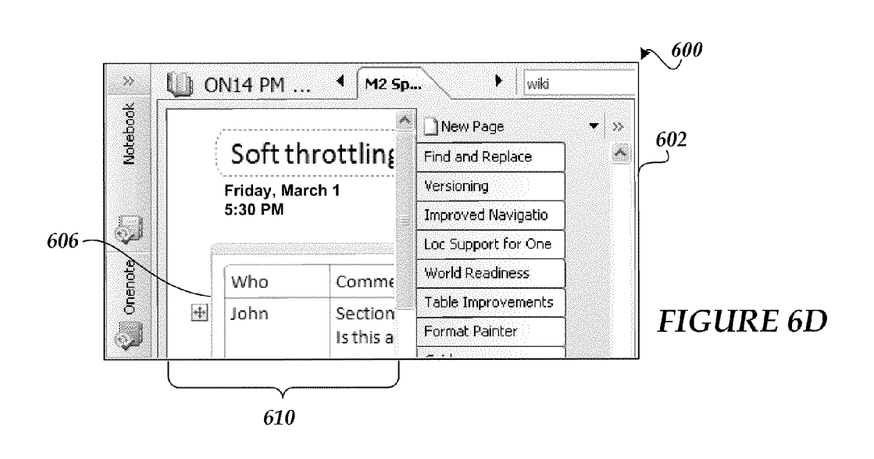

If the application window 602 is resized further such that the page width dimension 610 falls below the second transition threshold 514 (e.g., below about 30% wherein the available page width is now below about ~5.7 inches) but within resizing range 506, the interaction model 500 can be used to auto adjust the note container 606 width to fill approximately ninety five percent (95%) of the available page dimension 610 including the left margin as shown in FIG. 6C. The resize behavior continues during the resizing range 506 until the page width falls below the first transition threshold 512 (e.g., about 1.5 inches) and into non-resizing range 502 where the note container 606 remains at a fixed width as shown in FIG. 6D.

As discussed briefly above, resize parameters (e.g., 70% factor, 95% factor, etc.) and all threshold points (8.5, 5.7, 1.5 inches) can be updated based on user/usability feedback. In an embodiment, a note taking application does not store container resize width values until a user manually changes a width dimension by resizing a note container outline. Note container resizing includes reflowing content as the container is resized. To avoid "jumps" or erratic rendering at threshold points and to ensure a smooth reflow, the interaction model can be configured to include granular resizing operations that appear gradual over about a 0.5 inch range surrounding threshold points (e.g., 0.25 inches on either side of each threshold or transition point).

In one embodiment, the note taking application can use an interaction model that uses two separate flags to track 1) when a user manually resizes a note container outline, and 2) when the application implicitly fixes the note container outline width due to location of a second note container on a page.

Thus, for example, if user adds another note container in the 30% allocation area, then each note container outline can be automatically rendered at a fixed width, respectively. If a user manually adjusts the note container outline width (e.g., drags an edge) its flag is set to correspond as being fixed width.

Thus, the note taking application of an embodiment can operate to maintain note container outlines at fixed widths due to the introduction of a second page level object or manual adjustment of a note container. For example, a note container outline can be fixed to a current width dimension when a second page level object is added to a page. Container outline widths can also be locked for electronic ink. In one embodiment, if a user deletes a second page level object, the initial page object returns to wrapping status if: (a) the initial object is the only outline remaining on the page, and (b) the user had not manually changed the outline width due to resizing operations. Otherwise, the initial object does not return to wrapping status.

Dragging a single note container outline on the page surface can also operate to fix the position and size of the note container outline. In one embodiment, a default position for an originating note container outline is defined as about ten (10) pixels to the right of the page margin and about thirty (30) pixels below the top of the page title and time stamp, wherein opening a page and clicking anywhere on the page operates to create the originating note container at the default position.

In one embodiment, the following parameters and algorithm can be used as part of an interaction model including:

1) Viewport_Width=the visible width in inches of the page surface (e.g., white surface area, not including the section frame borders, page tabs, and scroll bars). A default example value is 8.5 inches.

2) Transition1 [default value=8.5 inches]=the VIEWPORT_WIDTH value below which the note container outline far edge switches to PERCENT1=70 of available width.

3) Transition2 [default value=5.7 inches]=the VIEWPORT_WIDTH value below which the note container outline far edge switches to PERCENT2=95%.

4) MaximumTransition [default value=10.6 inches]= maximum screen width beyond which the note container outline will not continue to widen.

5) Minimum Transition [default value=1.5 inches]=minimum screen width beyond which the note container outline will not continue to shrink.

6) Percent1: default value=70%–resizing percent for transition 1.

7) Percent2: default value=95%–resizing percent for transition 2.

8) Outline_Width=the width of the note container outline in inches.

9) Left_Margin [default width=0.3 inches]=this is the margin/space to the left of note container outline.

The above parameters can be implemented as registry key settings which can be altered based on user feedback and input.

The algorithm of an embodiment can be defined as:
SWITCH
    i. CASE (ViewPort_Width>Transition1) && (ViewPort_Width<=MaximumTransition), then Outline_Width=(ViewPort_Width*Percent1)–Left_Margin
    ii. CASE (ViewPort_Width<=Transition1) && (ViewPort_Width>MinimumTransition) then Outline_Width=(ViewPortWidth*Percent2)–Left_Margin
    iii. CASE (ViewPort_Width<=MinimumTransition) then Outline_Width=(MinimumTransition*Percent2)–Left_Margin
    iv. CASE ViewPort_Width>MaxTransition then Outline_Width=(MaxTransition*Percent1)–Left_Margin If a user input (e.g., click/tap) is located at the bottom of a note container outline within an associated expansion zone, then the note taking application of an embodiment can operate to expand the outline and position the insertion point at the user input location on the page. Double click operations of an embodiment operate to pin the cursor and create a new container outline even if it is within the zone of a previous container outline. For digital ink, the note taking application can operate to lock the size of an associated container outline to prevent resizing.

In an embodiment, the note taking application can be implemented within a networked communication environment that includes a networked association of computing devices/systems and associated communication infrastructure. The environment may include multiple communication networks, server components (e.g., project server, collaboration server, file server, etc.), and/or client devices/systems having various communication functionalities (e.g., smart phone, laptop, notebook, desktop, etc.).

Exemplary communication environments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures. An exemplary computer program product can include computer storage media that includes useable electronic note taking instructions.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 7:
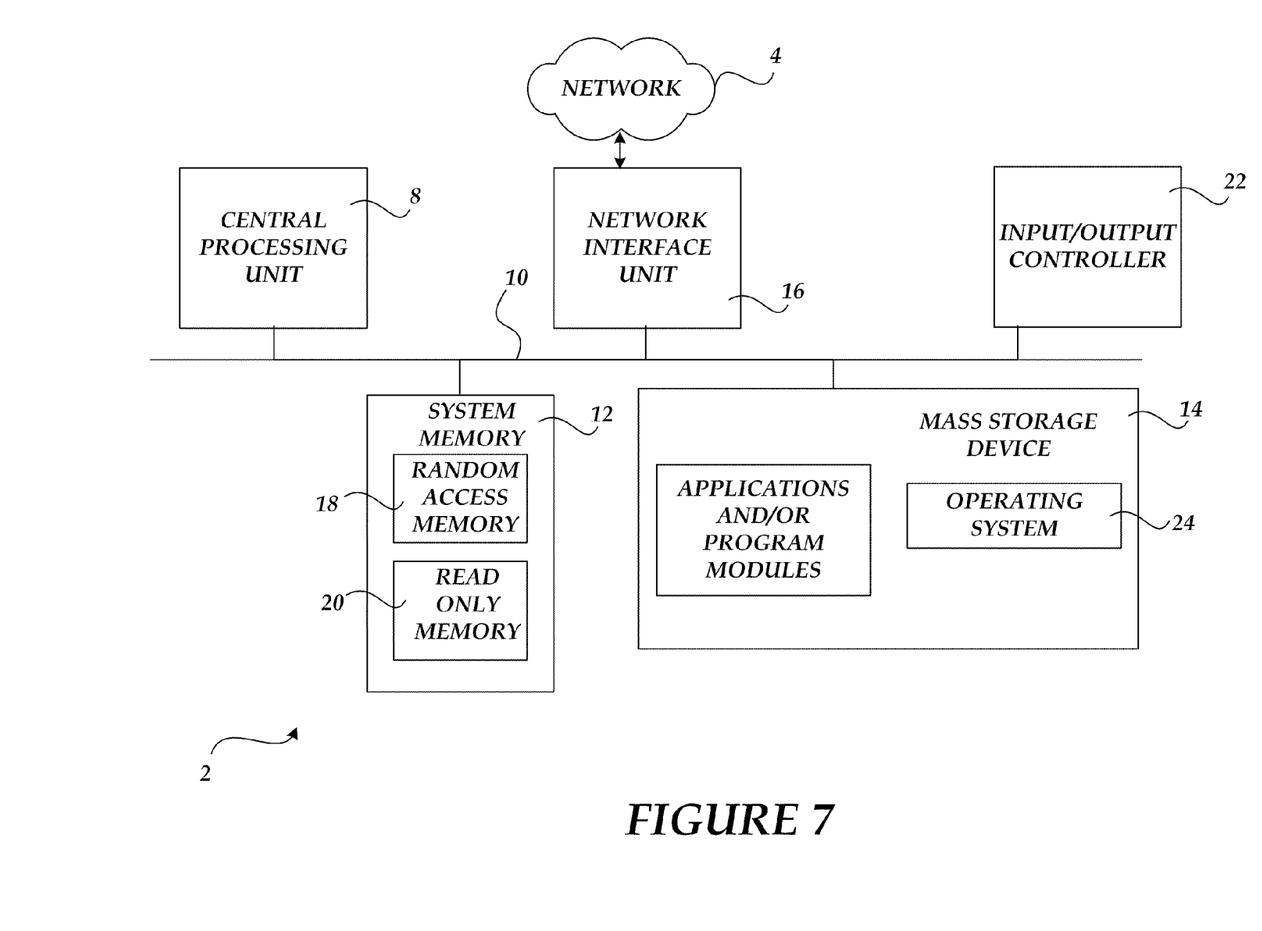
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable storage media including operational instructions to perform a method comprising:
   detecting an input operation associated with an electronic note page, wherein the input operation coincides with a first page location;
   positioning an originating container and a cursor at a default insertion point when the electronic note page is absent of a container and an input state corresponds to a first input operation in conjunction with the electronic note page;
   removing the originating container and positioning a new container and the cursor at the insertion point when the input state corresponds to a second input operation; and
   transitioning a display of the new container and content rendered on the electronic note page using an interaction model that includes resizing ranges to automatically adjust the new container to a first percentage of an available page dimension and to a second percentage of the available page dimension as part resizing operations.

2. The computer readable media of claim 1, further comprising selecting a picture in conjunction with a first picture input operation.

3. The computer readable media of claim 2, further comprising positioning the cursor at an insertion point in the picture in conjunction with a second picture input operation.

4. The computer readable media of claim 1, further comprising resetting the input state if a user navigates back to the electronic note page from a different electronic note page.

5. A computer-implemented method comprising:
- detecting an input operation associated with an electronic note page, wherein the input operation coincides with a first page location;
- positioning an originating container and a cursor at a default insertion point when the electronic note page is absent of a container and an input state corresponds to a first input operation in conjunction with the electronic note page;
- removing the originating container and positioning a new container and the cursor at the insertion point when the input state corresponds to a second input operation; and
- transitioning a display of the new container and content rendered on the electronic note page using an interaction model that includes resizing ranges to automatically adjust the new container to a first percentage of an available page dimension and to a second percentage of the available page dimension during resizing operations.

6. The computer-implemented method of claim 5, wherein the input state corresponds with a first input occurrence when the electronic note page is absent of a page object.

7. The computer-implemented method of claim 5, further comprising storing resize parameters of an application window when the electronic note page includes a note container.

8. The computer-implemented method of claim 5, wherein the default insertion point coincides with an upper left position portion of the electronic note page.

9. The computer-implemented method of claim 5, further comprising automatically resizing a container presentation to about seventy percent of an available page width as part of a first resizing operation and automatically resizing the container presentation to about ninety five percent of the available page width as part of a second resizing operation.

10. The computer-implemented method of claim 5, wherein the new container is used to contain one of text, digital ink, and a picture.

11. The computer-implemented method of claim 5, further comprising reflowing content based in part on container resizing operations.

12. The computer-implemented method of claim 5, further comprising using a tracking register to store user input parameters associated with the electronic note page.

13. The computer-implemented method of claim 12, further comprising resetting the tracking register upon navigating from the electronic note page.

14. The computer-implemented method of claim 5, wherein each resizing range includes a range of page widths.

15. The computer-implemented method of claim 5, wherein the first input operation associated with a blank electronic page operates to position an originating note container at a default location.

16. A computer processor-based device configured to:
- detect an input operation associated with an electronic note page, wherein the input operation coincides with a first page location;
- position an originating container and a cursor at a default insertion point when the electronic note page is absent of a container and an input state corresponds to a first input operation in conjunction with the electronic note page;
- remove the originating container and positioning a new container and the cursor at the insertion point when the input state corresponds to a second input operation; and
- in response to resizing, transition a display of the new container and content rendered on the electronic note page by resizing ranges to automatically adjust the new container to a first percentage of an available page dimension and, in response to further resizing, to a second percentage of the available page dimension.

17. The computer processor-based device of claim 16, further configured to reflow content based in part on container resizing operations.

18. The computer processor-based device of claim 16, further configured to use a tracking register to store user input parameters associated with the electronic note page.

19. The computer processor-based device of claim 18, further configured to reset the tracking register upon navigating from the electronic note page.

20. The computer processor-based device of claim 16, wherein each resizing range includes a range of page widths wherein a note container is presented to encompass a defined percentage of an available page width.

* * * * *